US007353845B2

(12) United States Patent
Underwood et al.

(10) Patent No.: US 7,353,845 B2
(45) Date of Patent: Apr. 8, 2008

(54) INLINE BLADDER-TYPE ACCUMULATOR FOR DOWNHOLE APPLICATIONS

(75) Inventors: Lance D. Underwood, Cypress, TX (US); Shantanu N. Swadi, Cypress, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 11/449,046

(22) Filed: Jun. 8, 2006

(65) Prior Publication Data

US 2007/0284010 A1 Dec. 13, 2007

(51) Int. Cl.
*F16L 55/04* (2006.01)

(52) U.S. Cl. ............................ 138/30; 138/31; 138/43; 138/26; 137/207

(58) Field of Classification Search .................. 138/30, 138/31, 42, 43; 137/207; 251/61, 61.1; 220/723, 720, 721

See application file for complete search history.

(56) References Cited

U.S. PATENT DOCUMENTS

| | | | | | |
|---|---|---|---|---|---|
| 2,609,001 | A | * | 9/1952 | Hebard | 138/30 |
| 2,721,580 | A | | 10/1955 | Greer | |
| 2,841,181 | A | * | 7/1958 | Hewitt et al. | 138/30 |
| 3,063,470 | A | * | 11/1962 | Forster | 138/30 |
| 3,536,102 | A | * | 10/1970 | Zahid et al. | 138/30 |
| 3,744,527 | A | * | 7/1973 | Mercier | 138/30 |
| 3,965,799 | A | | 6/1976 | Juvonen et al. | |
| 4,088,154 | A | * | 5/1978 | Patton et al. | 138/30 |
| 4,186,776 | A | | 2/1980 | Burton | |
| 4,209,041 | A | * | 6/1980 | Loukonen | 138/30 |
| 4,272,021 | A | * | 6/1981 | Standal | 239/106 |
| 4,361,188 | A | | 11/1982 | Russell | |
| 4,432,393 | A | * | 2/1984 | Mills | 138/30 |
| 4,628,964 | A | * | 12/1986 | Sugimura et al. | 138/30 |
| 4,633,910 | A | | 1/1987 | Sugimura | |
| 4,705,077 | A | * | 11/1987 | Sugimura | 138/30 |
| 4,732,176 | A | * | 3/1988 | Sugimura | 138/30 |
| 4,759,387 | A | * | 7/1988 | Arendt | 138/30 |
| 4,828,048 | A | | 5/1989 | Mayer et al. | |

(Continued)

FOREIGN PATENT DOCUMENTS

JP 6341403 A 5/1993

OTHER PUBLICATIONS

UK Search Report dated Sep. 14, 2007.

*Primary Examiner*—Patrick F. Brinson
(74) *Attorney, Agent, or Firm*—Conley Rose, P.C.

(57) ABSTRACT

An accumulator comprises a housing connected to a hydraulic system, an elastomeric bladder separating a gas compartment from a fluid compartment, and an anti-extrusion device. A method for operating an accumulator comprises connecting the accumulator to a hydraulic system, injecting an inert gas into a gas compartment to a precharge pressure, moving an anti-extrusion device to prevent a bladder from extruding into the hydraulic system, running the accumulator and the hydraulic system downhole, moving the anti-extrusion device to allow fluid communication between the hydraulic system and a fluid compartment, generating pressure fluctuations within the hydraulic system, and expanding or contracting the bladder in response to the pressure fluctuations without moving the anti-extrusion device. A method of improving fluid hammer performance comprises connecting the fluid hammer to an accumulator that produces a greater delivered horsepower from the fluid hammer as compared to a baseline horsepower when operating without the accumulator.

14 Claims, 10 Drawing Sheets

U.S. PATENT DOCUMENTS

| | | | | |
|---|---|---|---|---|
| 4,936,383 | A | 6/1990 | Towner et al. | |
| 5,732,741 | A * | 3/1998 | Shiery | 138/30 |
| 5,735,313 | A * | 4/1998 | Jenski et al. | 138/30 |
| 5,860,452 | A * | 1/1999 | Ellis | 138/30 |
| 6,131,613 | A * | 10/2000 | Jenski et al. | 138/30 |
| 6,155,361 | A | 12/2000 | Patterson | |
| 6,286,552 | B1 | 9/2001 | Shimbori et al. | |
| 6,418,969 | B1 * | 7/2002 | Bertagna | 138/30 |
| 6,874,540 | B2 * | 4/2005 | Lee | 138/31 |
| 7,108,015 | B2 * | 9/2006 | Lombari et al. | 138/30 |
| 2003/0034079 | A1 | 2/2003 | Lee | |

* cited by examiner

INLINE BLADDER-TYPE ACCUMULATOR FOR DOWNHOLE APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to various embodiments of an inline bladder-type accumulator for use in high pressure downhole applications, and methods of designing such accumulators for optimized performance. More particularly, the present invention relates to quick-acting, inline bladder-type accumulators with anti-extrusion capability for high charging pressures, and methods of employing such accumulators in downhole applications to absorb fluid shocks and to store hydraulic energy.

BACKGROUND

Downhole drilling may be performed with many different types of drill bits, including hammer bits that are operated with air or an incompressible fluid, such as water or drilling mud. Air and fluid-driven hammer bits are both effective in some respects, but each type presents several challenges. For example, hammer drilling with air sometimes results in difficulty removing cuttings, and hammer drilling with fluid results in the need to dissipate fluid shocks. In particular, a fluid hammer bit comprises a hydraulically driven percussive drilling tool designed to increase the rate of penetration in hard, friable formations as compared to conventional drill bits, such as roller cones, for example. During drilling, a piston in the fluid hammer cycles continuously between the top of its stroke and the bottom of its stroke when the hammer bit impacts the formation. At these two locations, the hammer piston is not moving, and therefore not consuming any fluid. However, the driving fluid is continuously being supplied to the hammer, such that during those brief moments when the piston is not moving, a fluid shock wave, or pressure pulsation, results. This fluid shock wave is commonly referred to as the "water hammer" effect, which is widely recognized for the potential to cause damage to pipes in any system where valves are suddenly closed, for example. With respect to a fluid hammer, fluid shock waves can be destructive to the hammer itself, to nearby components, and/or to the drill string. These pressure pulsations also represent a loss of hydraulic energy that could be made available to the fluid hammer.

To address such pressure pulsations in other applications, various types of accumulators or pulsation dampeners have been used upstream of devices in hydraulic systems that create pressure pulses. Accumulators are designed to absorb pressure pulses and may also be used to store hydraulic energy. Many hydraulic accumulators are gas loaded and comprise a fluid compartment and a gas compartment with an element separating the two. The fluid compartment communicates with the hydraulic circuit so that as the fluid system pressure rises, fluid enters the fluid compartment of the accumulator, acting against the element, which in turn compresses the gas and stores the fluid in the accumulator. Then, as pressure in the fluid system falls, the compressed gas expands against the element, which in turn forces the stored fluid back into the fluid system. Hydraulic accumulators with separating elements may further be divided into piston-type and bladder-type.

Piston-type accumulators typically comprise an outer cylindrical housing, an end cap at each end of the housing, a piston element, and a sealing system. The housing is designed to hold fluid pressure and guide the piston, which is the separating element between the gas compartment and the fluid compartment. When the gas compartment is charged, the piston is forced against the end cap at the fluid end of the housing. However, when the system fluid pressure exceeds the precharge pressure in the gas compartment, fluid flows in and forces the piston to move in the opposite direction toward the gas end of the housing. Thus, the piston compresses the gas to a higher gas compartment pressure while storing the fluid in the fluid compartment. As fluid pressure inside the accumulator falls below the gas compartment pressure, the gas forces the piston to move toward the fluid end of the housing again and expel fluid from the fluid compartment.

Piston-type accumulators are limited in at least two significant ways. First, the mass of the piston itself slows the response time of the accumulator to pressure spikes or fluctuations in the hydraulic circuit, which is an impediment when the accumulator must respond quickly. Second, the sealing elements disposed between the piston and the housing are exposed to high differential pressures, high velocities, and—in the case of downhole drilling tools—abrasive fluids, and therefore do not have a long operational life.

Bladder-type accumulators typically comprise a pressure vessel and an internal elastomeric bladder that separates the pressure vessel into a gas compartment and a fluid compartment. The gas compartment side of the bladder is charged with an inert gas, such as nitrogen, for example, to a precharge pressure that depends upon the operating pressure of the hydraulic system. The fluid compartment side of the bladder is in fluid communication with the hydraulic system. In the absence of hydraulic system pressure, bladder-type accumulators exposed to high precharge pressures must rely on anti-extrusion devices, such as a plate attached to the bladder, for example, that prevent the bladder from ballooning into the system piping and bursting.

During operation, if the hydraulic system pressure exceeds the gas-precharge pressure, fluid will enter the fluid compartment of the accumulator where that fluid is stored. As the fluid enters, it acts against the bladder, which in turn compresses the gas in the gas compartment until equilibrium is reached between the system pressure and the gas compartment pressure. Any time the hydraulic system pressure rises or falls, the bladder will expand or contract to reestablish pressure equilibrium. For example, if the hydraulic system pressure falls, the gas compartment pressure will also fall when the bladder contracts to force fluid out of the fluid compartment back into the hydraulic system. If the hydraulic system pressure rises, the gas compartment pressure will also rise when fluid flows into the fluid compartment, thereby expanding the bladder to compress the gas in the gas compartment until pressure equilibrium is again reached.

Bladder-type accumulators, although significantly more responsive than piston-type accumulators due to their lower mass, also have some operational limitations. First, some bladder-type accumulators are not inline, meaning the accumulator is not connected axially to the hydraulic system piping. Instead, the accumulator is connected to the hydraulic system from the side. This type of accumulator necessarily requires more radial space than an inline accumulator, which may make it unsuitable for use within a well bore where space is limited. Second, many bladder-type accumulators have anti-extrusion devices that are attached to and move with the bladder, thereby adding mass to the moveable bladder and increasing the response time of the accumulator to pressure fluctuations in the hydraulic system. Third, some bladder-type accumulators have non-moving anti-extrusion devices, such as sleeves with perforations through which the fluid must pass in order to enter or exit the bladder. Such perforations must be small enough to prevent the bladder from extruding in the presence of a precharge pressure that is not counterbalanced by system pressure. However, small perforations limit the response time of the accumulator because the fluid flowing into the bladder must pass through such perforations. In addition, openings like perforations in a sleeve produce turbulence or disturbances in the fluid that can erode the sleeve over time.

Therefore, a need exists for a downhole accumulator designed for high pressures and high flow rates, with an anti-extrusion device that does not significantly inhibit the response time of the bladder by increasing its mass. Moreover, a need exists for an accumulator that is sized appropriately for the space limitations imposed by downhole applications. To minimize costs associated with retrieving the accumulator from the well bore for servicing and repair, a need exists for an accumulator without components that must be frequently replaced due to wear caused by high fluid velocities and high differential pressures.

SUMMARY OF THE INVENTION

In one aspect, the present disclosure relates to an accumulator for downhole operations comprising a housing that connects inline to a hydraulic system, an elastomeric bladder disposed internally of the housing and separating a gas compartment from a fluid compartment, and an anti-extrusion device having a first position that blocks the fluid compartment from fluid communication with the hydraulic system, and a second position that opens the fluid compartment to fluid communication with the hydraulic system, wherein the anti-extrusion device does not move from the second position in response to pressure fluctuations in the hydraulic system during operation. The anti-extrusion device may move from the first position to the second position in response to downhole pressure or in response to a combination of downhole pressure and operating differential pressure. The anti-extrusion device may be a cylinder, and the fluid compartment may be formed between the bladder and the cylinder. The accumulator may further comprise springs that bias the anti-extrusion device to the first position. The elastomeric bladder may comprise a highly saturated nitrile material. In an embodiment, only the elastomeric bladder responds dynamically to the pressure fluctuations in the hydraulic system during operation. The accumulator may further comprise a flow diverter that diverts a well bore fluid towards the fluid compartment.

In an embodiment, the accumulator further comprises a mandrel disposed internally of the housing, wherein the fluid compartment is formed between the bladder and the mandrel. The anti-extrusion device may comprise a piston that engages the mandrel in the first position to form an extrusion gap sized to prevent the bladder from extruding into the hydraulic system when a precharge pressure is applied to the gas compartment. The mandrel may comprise an internal flow bore in fluid communication with the hydraulic system. In an embodiment, the mandrel comprises at least one port in fluid communication with the fluid compartment when the anti-extrusion device is in the second position. The mandrel may be the anti-extrusion device. The accumulator may further comprise springs that bias the anti-extrusion device to the first position.

In another aspect, the present disclosure relates to a drilling system that comprises the accumulator. That drilling system may further comprise a fluid hammer of a given size positioned downstream of the accumulator and a fluid hammer bit driven by the fluid hammer. In an embodiment, the gas compartment of the accumulator may comprise a downhole accumulator volume that produces a higher delivered horsepower from the fluid hammer to the fluid hammer bit versus a baseline horsepower from the fluid hammer when operating without the accumulator. The fluid hammer of the drilling system may comprise a piston that travels through a stroke in its cycle to produce a fluid hammer volume, wherein the ratio of the accumulator volume to fluid hammer volume ranges between 2 and 25. The delivered horsepower may be at least 25 percent greater than the baseline horsepower. The downhole accumulator volume may be a function of the given size of the fluid hammer, a precharge pressure in the gas compartment, a surface volume of the gas compartment, a surface temperature, a downhole temperature, and a downhole pressure. The precharge pressure may be approximately 30 to 70 percent of the downhole pressure.

In still another aspect, the present disclosure is directed to a method for operating an accumulator in a well bore comprising connecting the accumulator inline to a hydraulic system, injecting an inert gas into a gas compartment of the accumulator to a precharge pressure, moving an anti-extrusion device of the accumulator to a first position that prevents a bladder of the accumulator from extruding into the hydraulic system, running the accumulator and the hydraulic system into a well bore, moving the anti-extrusion device to a second position that allows fluid communication between the hydraulic system and a fluid compartment of the accumulator, generating pressure fluctuations within the hydraulic system, and expanding or contracting the bladder in response to the pressure fluctuations without moving the anti-extrusion device from the second position. The method may further comprise absorbing the pressure fluctuations by flowing a fluid from the hydraulic system into the fluid compartment when a hydraulic system pressure exceeds a gas compartment pressure. The method may further comprise delivering a hydraulic energy by expelling the fluid from the fluid compartment when the hydraulic system pressure drops below the gas compartment pressure. Delivering the hydraulic energy may increase a delivered horsepower from a fluid hammer to a fluid hammer bit in the hydraulic system. The method may further comprise designing a downhole accumulator volume such that the delivered horsepower is at least 25 percent greater than a baseline horsepower from the fluid hammer when operating without the accumulator. Designing the downhole accumulator volume may comprise optimizing the downhole accumulator volume based on a size of the fluid hammer, the precharge pressure, an accumulator volume, a surface temperature, a downhole temperature, and a downhole pressure. In an embodiment, moving the anti-extrusion device to the first position may further comprise preventing fluid communication between the hydraulic system and the fluid compartment. In another embodiment, moving the anti-extrusion device to the first position may further comprise moving a piston to constrain the bladder and creating an extrusion gap. Moving the anti-extrusion device to the second position may comprise overcoming a biasing force exerted on a sliding component and aligning ports in the sliding component with the fluid compartment.

In yet another aspect, the present disclosure is directed to a method of improving the performance of a fluid hammer comprises connecting the fluid hammer to an accumulator comprising a downhole volume that produces a delivered horsepower from the fluid hammer of at least 25 percent greater than a baseline horsepower from the fluid hammer when operating without the accumulator. The accumulator may respond approximately instantaneously to pressure fluctuations generated by the fluid hammer. The downhole volume may comprise an optimized downhole volume to produce the delivered horsepower.

Other aspects and advantages of the invention will be apparent from the following description and the appended claims. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of the present invention, reference will now be made to the accompanying drawings, wherein.

Notation and Nomenclature

Figure 1:
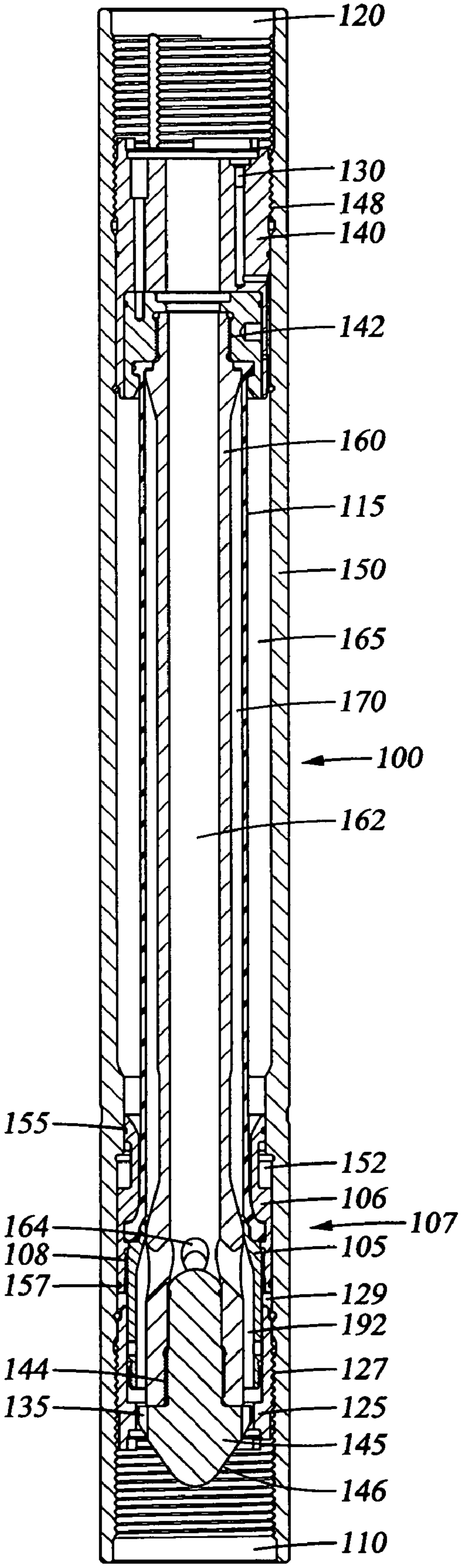
FIG. 1 is a schematic cross-sectional view of one embodiment of an inline, flow-through, bladder-type accumulator with an anti-extrusion device comprising a piston, shown in an assembled configuration.

Certain terms are used throughout the following description and claims to refer to particular assembly components. This document does not intend to distinguish between components that differ in name but not function. In the following discussion and in the claims, the terms "including" and "comprising" are used in an open-ended fashion, and thus should be interpreted to mean "including, but not limited to . . . ".

References to "upper" and "lower" are relative to the terminal end of the drilling assembly, where a drill bit is positioned. For example, the first accumulator embodiment disclosed herein has a piston comprising two sub-components, one referred to as the "upper piston" and the other referred to as the "lower piston." The lower piston is closer to the terminal end of the drilling assembly than the upper piston.

As used herein, the term "inline accumulator" refers to an accumulator that connects into and aligns longitudinally with other hydraulic system components rather than being connected to the side and extending radially outwardly from the hydraulic system.

DETAILED DESCRIPTION

Various embodiments of inline bladder-type accumulators with pressure actuated anti-extrusion capability, methods of designing such accumulators, and methods of employing such accumulators with downhole equipment that creates pressure pulsations, such as fluid hammers, reciprocating pumps, pressure intensifiers, and the like, will now be described with reference to the accompanying drawings, wherein like reference numerals are used for like features throughout the several views. There are shown in the drawings, and herein will be described in detail, specific embodiments of inline bladder-type accumulators utilizing pressure actuated anti-extrusion capability and methods of designing and operating such accumulators, with the understanding that this disclosure is representative only and is not intended to limit the invention to those embodiments illustrated and described herein. The embodiments of inline bladder-type accumulators disclosed herein may be used in any type of downhole system where it is desired to mitigate the effects of pressure pulsations created by downhole equipment, including fluid hammers, reciprocating pumps, and pressure intensifiers, for example, and where it is desired to store the energy associated with such pressure pulsations, thereby improving the energy efficiency of the downhole system. The different teachings of the embodiments disclosed herein may be employed separately or in any suitable combination to produce desired results.

Figure 2:
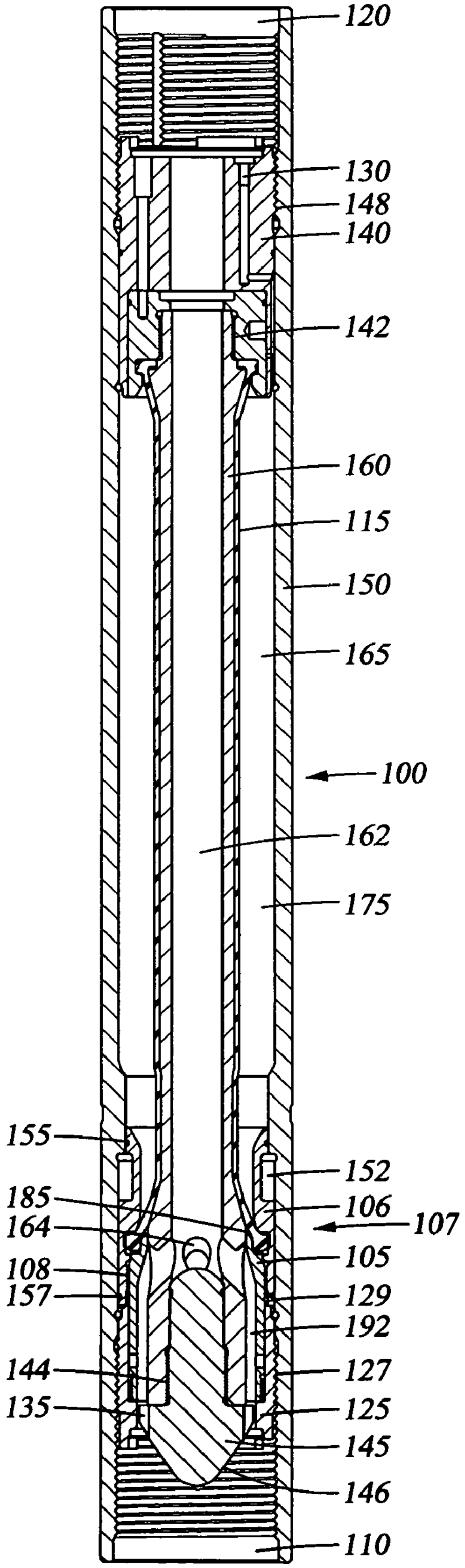
FIG. 2 is a schematic cross-sectional view of the accumulator of FIG. 1, shown in a precharged configuration.
Figure 3:
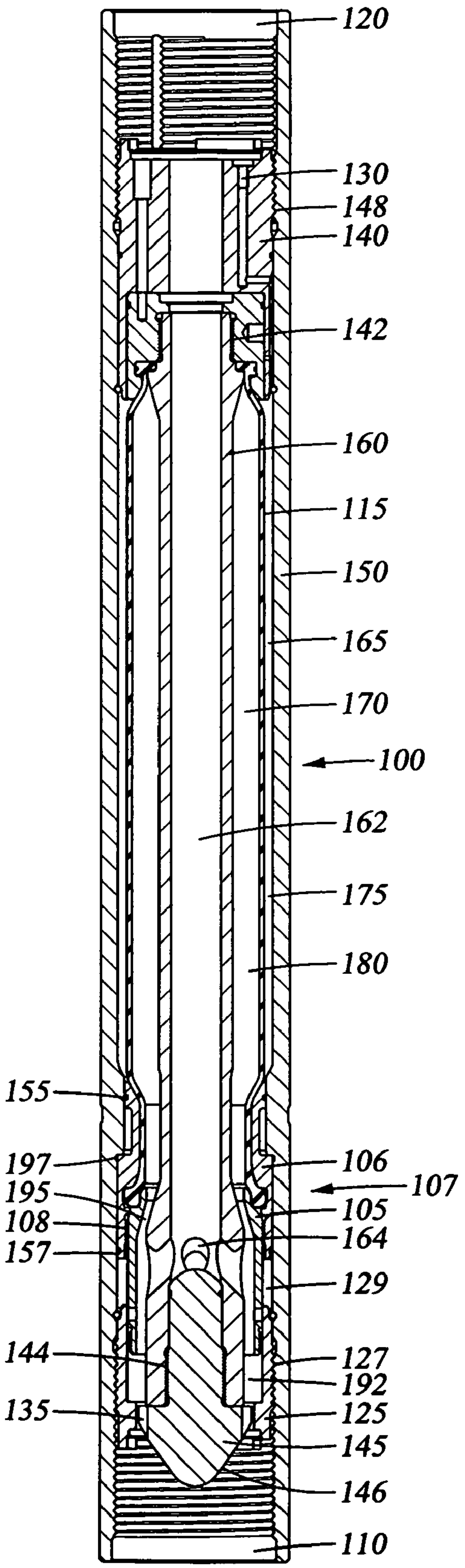
FIG. 3 is a schematic cross-sectional view of the accumulator of FIG. 1, shown in a downhole configuration.

FIGS. 1, 2 and 3 depict one embodiment of an inline bladder-type accumulator 100 with anti-extrusion capability in an assembled configuration, a precharged configuration, and a downhole configuration, respectively. The accumulator 100 comprises an outer housing 150, a bladder retainer 140, a cylindrical mandrel 160 with a flow bore 162 therethrough and radial ports 164 at the lower end thereof leading to a flow cavity 192, a flow diverter 145 with a curved nose 146 and flow channels 135 in fluid communication with the flow cavity 192, a flexible elastomeric bladder 115 surrounding the mandrel 160 and forming a fluid compartment 170 therebetween, a piston 107 with seals 155, 157 that engage the housing 150 and form a chamber 152, and a retaining nut 125.

The housing 150 comprises an upstream threaded end 120 for connecting to a drill string or another system component, and a downstream threaded end 110 for connecting to a fluid hammer or another system component that produces pressure pulsations downstream of the accumulator 100. In an embodiment, the housing 150 connects at upstream threaded end 120 to a drill string and at downstream threaded end 110 to a fluid hammer, which in turn connects to a fluid hammer bit. In an embodiment, the housing 150 is approximately 7 inches in diameter and approximately 5 feet long. The bladder retainer 140 connects via threads 148 to the housing 150 and via threads 142 to the mandrel 160. Disposed within the bladder retainer 140 is a threaded sleeve 130 to which a valve may be connected to inject an inert gas, such as nitrogen, into a gas compartment 165 disposed between the inner surface of the housing 150 and the outer surface of bladder 115. Thus, the bladder 115 isolates the inert gas from the working fluid. The piston 107 comprises two sub-components, an upper piston 106 and a lower piston 105 connected via threads 108. The retaining nut 125 connects via threads 127 to the housing 150, and the flow diverter 145 connects via threads 144 to the mandrel 160. The bladder retainer 140 and the retaining nut 125 centralize the mandrel 160 and the connected flow diverter 145 within the housing 150.

When the accumulator 100 is in the assembled configuration shown in FIG. 1, the accumulator 100 is not pre-charged with gas, and there is no fluid flow through or stored in the accumulator 100 as evidenced by the position of the bladder 115 and the piston 107. In particular, the elastomeric bladder 115 assumes a natural configuration (i.e. not expanded or compressed), and there is no precharged gas in the gas compartment 165, nor stored fluid in the fluid compartment 170. In various embodiments, the bladder 115 may comprise a molded compression-type bladder or a mandrel wrapped bladder. In an embodiment, the bladder 115 is formed of a highly saturated nitrile material. In the assembled configuration, the upper piston 106 is shouldered against the bladder 115 and there is a space 129 between the upper piston 106 and the retaining nut 125.

FIG. 2 depicts the accumulator 100 in a precharged configuration, meaning that gas has been injected through the threaded sleeve 130 in the bladder retainer 140 into the gas compartment 165 such that the accumulator 100 is precharged with nitrogen 175 or another suitable inert gas at a relatively high pressure, such as approximately 50% of the downhole pressure, for example. The chamber 152 formed between the piston 107 and the housing 150 contains air or inert gas at a relatively low pressure, such as approximately atmospheric pressure, for example. There is no fluid flowing into or stored within the accumulator 100 in the precharged position. Due to the force exerted by the precharged nitrogen 175 on the bladder 115, and the absence of a counterbalancing force from fluid inside the fluid compartment 170, the bladder 115 is shown compressed by the nitrogen 175 and collapsed against the outer surface of the mandrel 160. The wall thickness of the bladder 115 is designed such that the bladder 115 is both pliable and strong. In one embodiment, the wall thickness is 3/16 of an inch.

Still referring to FIG. 2, as the nitrogen 175 fills the gas compartment 165, the bladder 115 pushes the piston 107 in the downstream direction until the lower piston 105 shoulders against the retaining nut 125, closing the space 129 shown in FIG. 1. This movement of the piston 107 results in an extremely small radial clearance or gap 185 between the lower piston 105 and the mandrel 160. The resulting gap 185 is commonly referred to as an extrusion gap 185 because it is sized to prevent extrusion of the elastomeric bladder 115 into the flow cavity 192 when subjected to high charging pressures. The precharge pressure is a function of the hydrostatic pressure of the well bore, which relates to the depth at which the accumulator 100 will operate. Typically, hydrostatic pressure is about 0.4 to 0.8 pounds per square inch (psi) per foot of well bore depth, and precharge pressure is on the order of 30 percent to 70 percent of the system pressure, which comprises the downhole hydrostatic pressure and the operating pressure differential. In various embodiments, the precharge pressure may range from about 600 psi to about 5,000 psi, and the extrusion gap 185 is only a few thousandths of an inch to ensure that the bladder 115 does not extrude into the flow cavity 192 and burst under this precharge pressure. With higher precharge pressures, a smaller extrusion gap 185 is required. Hence, the piston 107 comprises an anti-extrusion device in this embodiment of the accumulator 100, and in the precharged configuration shown in FIG. 2, the bladder 115 is constrained by the piston 107 and the mandrel 160. Therefore, the bladder 115 can sustain the high precharge pressures required for downhole use. The gas 175 in the gas compartment 165 will act as a "spring" to absorb fluid shocks and/or store hydraulic energy once the accumulator 100 is in operation.

FIG. 3 depicts the accumulator 100 in a downhole configuration. In particular, as the accumulator 100 in the precharged position of FIG. 2 is run downhole, well bore fluid, such as drilling mud, for example, flows upwardly into the accumulator 100, and is directed by the curved nose 146 to flow through the flow channels 135 in the flow diverter 145, into the flow cavity 192 and through the ports 164 into the flow bore 162 of the mandrel 160. The hydrostatic pressure increases as depth increases, and the pressure force exerted by the fluid acts against cavity 152, which is roughly at atmospheric pressure in the precharged position of FIG. 2. As the accumulator 100 is run downhole, the pressure force drives the lower piston 105 and the upper piston 106 in the upstream direction until the upper piston 106 engages a shoulder 197 within the housing 150 as shown in FIG. 3, thereby compressing cavity 152. Translation of the piston 107 to engage shoulder 197 opens a flow path 195 that communicates with the flow cavity 192, thereby allowing fluid 180 to occupy the fluid compartment 170 in the accumulator 100. In particular, fluid 180 will flow through the flow cavity 192 and the flow channel 195 into the fluid compartment 170 to expand the bladder 115 and be stored by the accumulator 100, as shown in FIG. 3. In this configuration, the pressure is balanced across the bladder 115.

In operation, once the piston 107 engages the housing 150 at shoulder 197, the piston 107 no longer moves in response to pressure fluctuations in the system. Instead, only the bladder 115 expands or contracts, and therefore, because the bladder 115 has such a low mass, the accumulator 100 is very quick-acting and responsive to changes in system pressure. The system pressure comprises the hydrostatic pressure within the well bore and may also comprise differential pressure due to fluid being pumped from the surface through the flow bore 162 of the mandrel 160 to a downstream device, such as a fluid hammer.

As the downstream device operates, fluid consumed by that device, as well as its operating pressure, may vary. Take, for example, the case where the downstream device is a fluid hammer operating at a 300 gallon per minute (gpm) nominal flow rate. When the fluid hammer piston is either at the bottom of its stroke (when the hammer bit impacts the formation) or at the top of its stroke, the fluid hammer piston does not consume any of the 300 gpm nominal flow rate, and the instantaneous fluid velocity is zero. At these two top and bottom positions, a pressure spike will result due to the water hammer effect. When this pressure spike reaches the accumulator 100, an influx of fluid 180 flows into the fluid compartment 170, expanding the bladder 115 and thereby compressing the nitrogen 175 in the gas compartment 165.

By compressing the nitrogen 175, the pressure of the nitrogen 175 increases and more energy is stored in the gas compartment 165. Then, on the down stroke cycle, when the fluid hammer piston is capable of consuming 400 to 500 gpm, for example, the differential pressure drops dramatically. As the system pressure drops below the compressed pressure of the nitrogen 175 in the gas compartment 165, the bladder 115 will collapse toward the mandrel 160, thereby forcing fluid 180 out of the fluid compartment 170, into the flow path 195, through the flow cavity 192 and the flow channels 135 in the flow diverter 145, and finally out of the accumulator 100 towards the downstream device. Thus, as fluid 180 is forced out of the fluid compartment 170, the accumulator 100 instantaneously provides the fluid hammer with a higher flow rate than the nominal 300 gpm that is continuously being pumped into the hydraulic system. Again, the piston 107 of the accumulator 100 does not move further in response to pressure fluctuations. Thus, only the bladder 115 expands and contracts dynamically with pressure pulses, and therefore, only the low mass of the bladder 115 affects the response time of the accumulator 100. In an embodiment, the accumulator 100 responds to pressure fluctuations in approximately 5 milliseconds.

Figure 4:
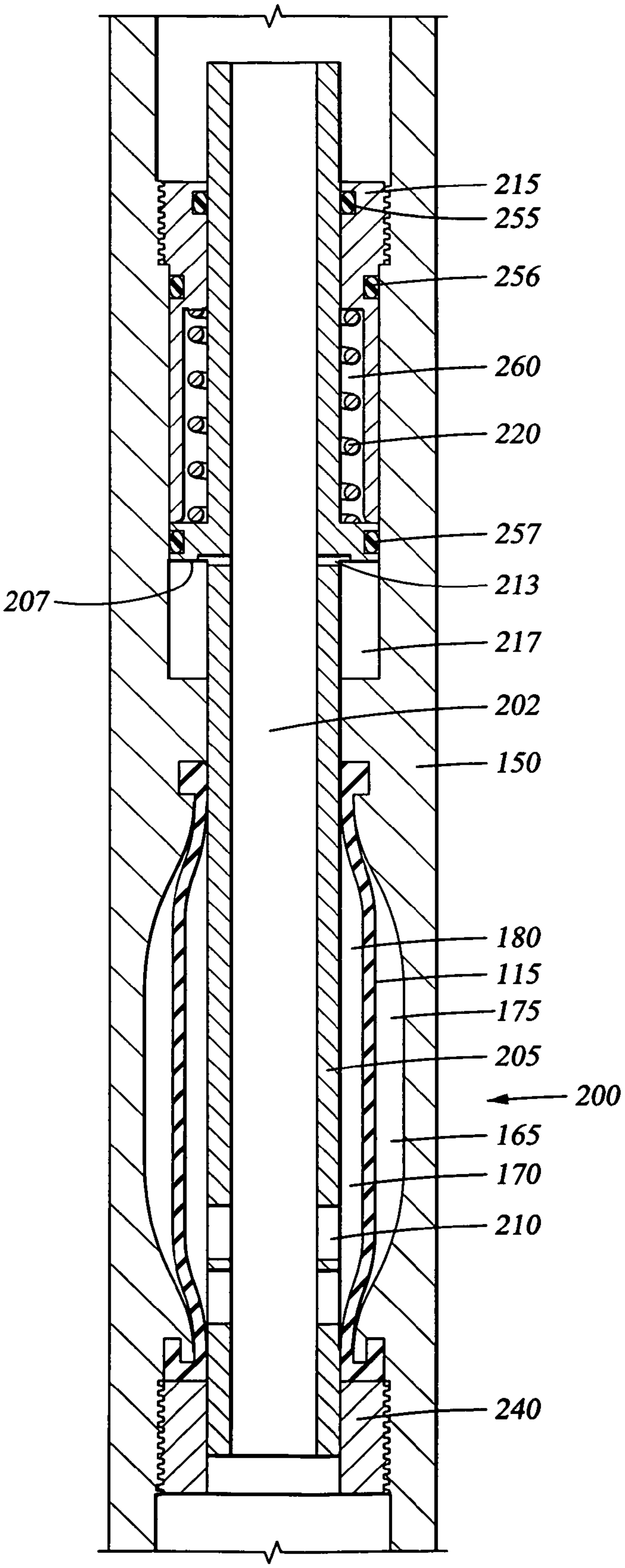
FIG. 4 is a schematic cross-sectional view of a second embodiment of an inline, flow-through, bladder-type accumulator with an anti-extrusion device comprising a pressure actuated ported sliding mandrel.

The anti-extrusion device in accumulator 100 is a pressure actuated two-part piston 107, but the anti-extrusion device of an inline bladder-type accumulator may take different forms. FIG. 4 depicts a second embodiment of an inline bladder-type accumulator 200 in the downhole configuration. The accumulator 200 utilizes a pressure actuated ported sliding mandrel 205 as the anti-extrusion device. The inline bladder-type accumulator 200 comprises the sliding mandrel 205 with an internal flow bore 202 and ports 210 extending through the wall thereof, a spring housing 215 forming a spring chamber 260 that encloses springs 220, and a flexible elastomeric bladder 115 retained by a bladder retainer 240, all enclosed within a cylindrical housing 150. The bladder 115 separates a gas compartment 165, located between the outer surface of the bladder 115 and the inner surface of the housing 150, from a fluid compartment 170, located between the inner surface of the bladder 115 and the outer surface of the mandrel 205. The gas compartment 165 is charged with an inert gas, such as nitrogen 175, and the fluid compartment 170 contains fluid 180 in the downhole configuration depicted. The spring housing 215 comprises seals 255, 257 to isolate the spring chamber 260 with springs 220 disposed therein from well bore fluid. The spring housing 215 and springs 220 are disposed within an annular cavity 217 in the housing 150, which is in fluid communication via channel 213 in the sliding mandrel 205 to the flow bore 202 of the mandrel 205.

Before running the accumulator 200 downhole, when the accumulator 200 is in the precharged position (not shown), the ports 210 are positioned downstream of the bladder 115 so that the bladder 115 cannot extrude through them. However, as in the embodiment of the accumulator 100 shown in FIGS. 1-3, hydrostatic fluid pressure acting on the accumulator 200 increases as the accumulator 200 travels downhole, which changes the position of the sliding mandrel 205 to the location shown in FIG. 4. In particular, the hydrostatic pressure acting through the channel 213 onto the fluid in cavity 217 increases as the accumulator 200 travels downhole. The sliding mandrel 205 is sealed 255, 257 to the housing 150 creating cavity 260, which contains air or an inert gas at relatively low pressure, such as atmospheric pressure. When the force acting on surface 207 of the sliding mandrel 205 exceeds the force required to compress the springs 220, the sliding mandrel 205 translates in the upstream direction against the force of springs 220, thereby exposing the ports 210 in the sliding sleeve 205 to the fluid compartment 170 as shown in FIG. 4.

In operation, the fluid hammer disposed below the accumulator 200 does not consume any fluid when the fluid hammer piston is at the impact position or at the top of its stroke, and a pressure spike results due to the water hammer effect. When the pressure spike reaches the accumulator 200, an influx of fluid 180 flows through the ports 210 in the sliding mandrel 205 into the fluid compartment 170, expanding the bladder 115 and thereby compressing the nitrogen 175 in the gas compartment 165. By compressing the nitrogen 175, the pressure of the nitrogen 175 increases and more energy is stored in the gas compartment 165. Then, on the down stroke cycle, when the fluid hammer piston is capable of consuming more than the nominal flow rate of fluid continuously being pumped into the system, the differential pressure drops dramatically. As the system pressure drops below the compressed pressure of the nitrogen 175 in the gas compartment 165, the bladder 115 will collapse toward the sliding mandrel 205, thereby forcing fluid 180 out of the fluid compartment 170, through the ports 210 in the sliding mandrel 205, into the flow bore 202 and finally out of the accumulator 200 towards the downstream device. Thus, as fluid 180 is forced out of the fluid compartment 170, the accumulator 200 instantaneously provides the fluid hammer with a higher flow rate than the nominal flow rate that is continuously being pumped into the hydraulic system.

Figure 5:
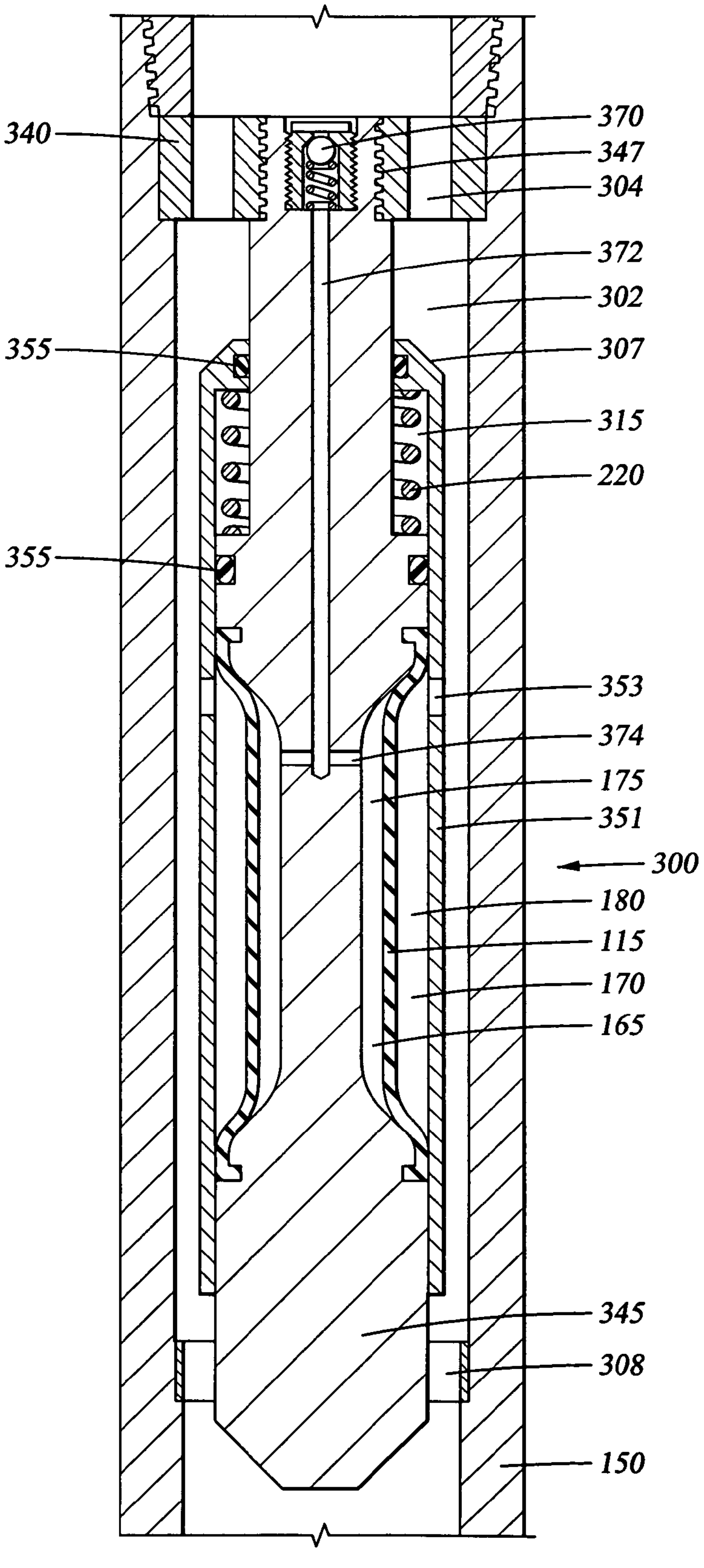
FIG. 5 is a schematic cross-sectional view of a third embodiment of an inline, flow-around, bladder-type accumulator with an anti-extrusion device comprising a pressure actuated ported sliding cylinder.

In other embodiments, the routing of flow through the accumulator may also vary. FIGS. 1-4 depict “flow-through” accumulators 100, 200 with flow bores 162, 202 that direct fluid flow through the center of the accumulator 100, 200, and that flow is diverted to an externally located bladder 115. FIG. 5, on the other hand, depicts a third embodiment of an inline bladder-type accumulator 300, namely a “flow-around” accumulator 300, wherein the fluid 180 flows along an external flow path 302, and that flow is diverted to an internally located bladder 115.

FIG. 5 depicts the accumulator 300 in the downhole configuration. Accumulator 300 comprises a sliding cylinder 351 with ports 353 extending through a wall thereof, a bladder support mandrel 345 connected via threads 347 to a mandrel support ring 340 comprising flow ports 304 leading into the flow path 302, a cavity 315 disposed between the sliding cylinder 351 and the bladder support mandrel 345 wherein springs 220 reside, and a flexible elastomeric bladder 115, all enclosed within a cylindrical housing 150. Seals 355 are provided between the sliding cylinder 351 and the bladder support mandrel 345, sealing the cavity 315, which contains air or an inert gas at a relatively low pressure, such as atmospheric pressure. A gas compartment 165, shown precharged with nitrogen 175, is located between the inner surface of the bladder 115 and the outer surface of the bladder support mandrel 345, and a fluid compartment 170, shown partially filled with fluid 180, is located between the outer surface of the bladder 115 and the inner surface of the cylinder 351. The bladder support mandrel 345 comprises a gas fill flow bore 372 connected to a check valve 370 into which the nitrogen 175 is injected to precharge the accumulator 300. In the embodiment shown, the gas flow bore 372 is in communication with the gas compartment 165 via channels 374.

Before running the accumulator 300 downhole, when the accumulator 300 is in the precharged position (not shown), the ports 353 are positioned upstream of the bladder 115 so that the bladder 115 cannot extrude through them. However, as in the previous embodiments, hydrostatic pressure acting on the cavity 315 increases as the accumulator 300 travels downhole, which changes the position of the sliding mandrel 205 to the location shown in FIG. 5. In particular, in accumulator 300, fluid flow is directed by the bladder support mandrel 345 to flow along the outwardly lying flow path 302 located between the inner surface of the housing 150 and the outer surface of the sliding cylinder 351. When the hydrostatic pressure force acting on surface 307 of the sliding cylinder 351 exceeds the force required to compress the springs 220, the sliding cylinder 351 translates in the downstream direction against the force of springs 220, thereby exposing the ports 353 in the sliding cylinder 351 to the fluid compartment 170 located outside of the bladder 115 as shown in FIG. 5.

In operation, the fluid hammer disposed below the accumulator 300 does not consume any fluid when the fluid hammer piston is at the impact position or at the top of its stroke, and a pressure spike results due to the water hammer effect. When the pressure spike reaches the accumulator 300, an influx of fluid 180 flows upwardly through lower passages 308 into the outwardly lying flow path 302 and through ports 353 in the sliding cylinder 351 to reach the fluid compartment 170. As fluid 180 fills the fluid compartment 170, the bladder 115 contracts, thereby compressing the nitrogen 175 in the gas compartment 165. By compressing the nitrogen 175, the pressure of the nitrogen 175 increases and more energy is stored in the gas compartment 165. Then, on the down stroke cycle, when the fluid hammer piston is capable of consuming more than the nominal flow rate of fluid continuously being pumped into the system, the differential pressure drops dramatically. As the system pressure drops below the compressed pressure of the nitrogen 175 in the gas compartment 165, the bladder 115 will expand toward the sliding cylinder 351, thereby forcing fluid 180 out of the fluid compartment 170, through the ports 353 in the sliding cylinder 351, into the flow path 302 and finally through the passages 308 out of the accumulator 300 towards the downstream device. Thus, as fluid 180 is forced out of the fluid compartment 170, the accumulator 300 instantaneously provides the fluid hammer with a higher flow rate than the nominal flow rate that is continuously being pumped into the hydraulic system.

Figure 6:
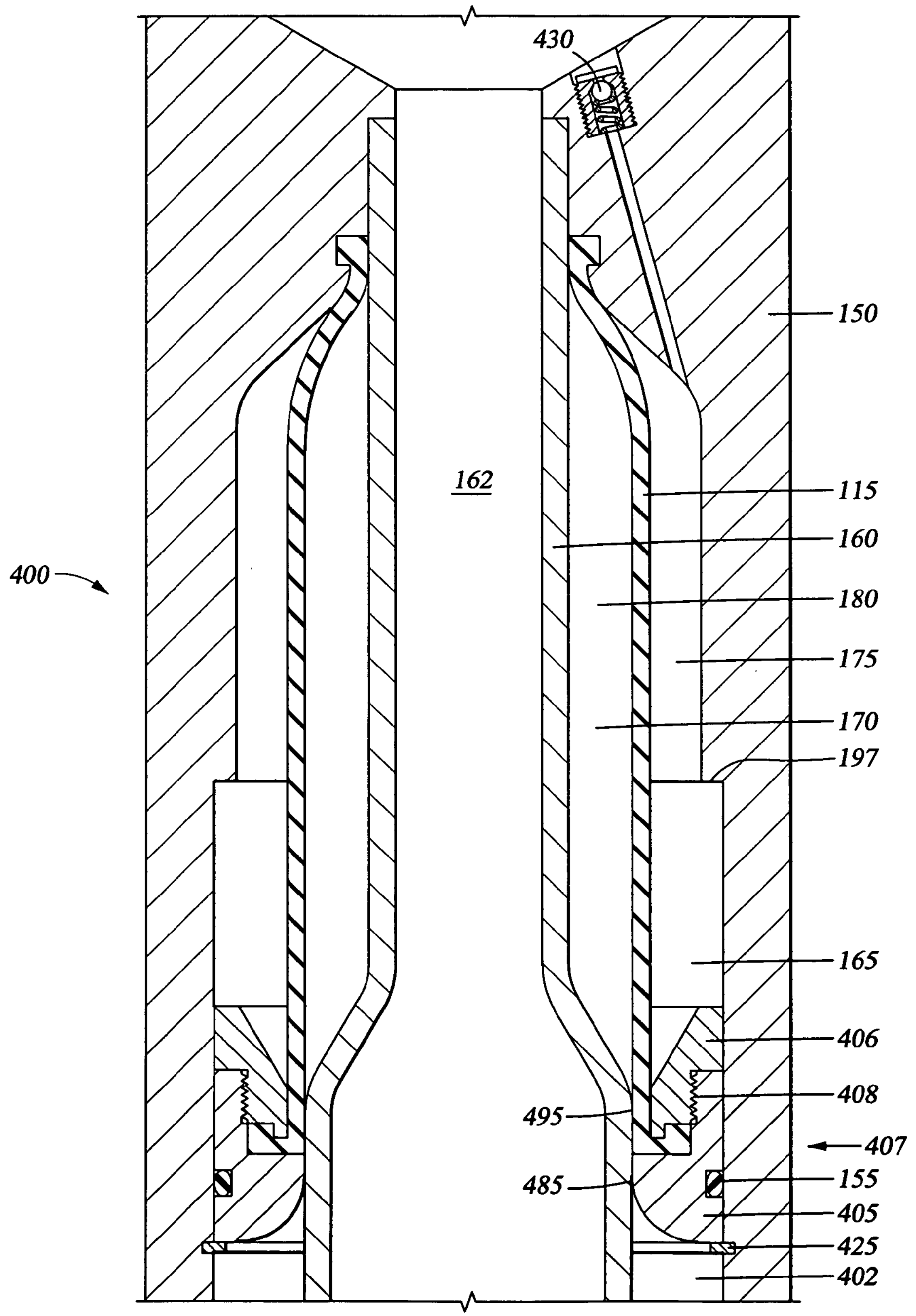
FIG. 6 is a schematic cross-sectional view of a fourth embodiment of an inline, flow-through, bladder-type accumulator with an anti-extrusion device comprising a piston.

Referring now to FIG. 6, a fourth embodiment of an inline, flow-through, bladder-type accumulator 400 is depicted that utilizes an anti-extrusion device similar to the accumulator 100 shown in FIGS. 1-3, namely a piston 407 consisting of two sub-components, an upper piston 406 and a lower piston 405. However, in accumulator 400, the piston 407 is bound from further movement at the downstream end by a retainer ring 425. FIG. 6 shows the accumulator 400 in the precharged configuration. The accumulator 400 comprises a cylindrical mandrel 160 with an internal flow bore 162, a flexible elastomeric bladder 115 surrounding the mandrel 160, a piston 407 with a seal 155, a threaded sleeve 430 to which a valve may be connected to inject nitrogen, and a retainer ring 425, all enclosed within a cylindrical housing 150. The bladder 115 resides between two compartments, a gas compartment 165, shown precharged with nitrogen 175, and a fluid compartment 170 that has fluid 180 therein in the position shown in FIG. 6.

The piston 407 comprises an upper piston 406 and a lower piston 405 connected via threads 408. The piston 407 constrains the bladder 115, and an extrusion gap 485 is provided between the lower piston 405 and the mandrel 160. The piston 407 is also shouldered against the retainer ring 425 and blocks a flow channel 495 that would otherwise allow fluid communication between chamber 402 and the fluid compartment 170. However, as in the previous embodiments, when the accumulator 400 is run downhole, the hydrostatic pressure acting on the accumulator 400 increases and the position of the piston 407 will change. In particular, the hydrostatic force exerted on the piston 407 via chamber 402 will force the piston 407 to translate in the upstream direction until the upper piston 406 contacts the shoulder 197 located along the inner surface of the housing 150. Translation of the piston 407 in this manner will open the flow channel 495, which is shown blocked in FIG. 6 by the piston 407, thereby allowing fluid 180 to flow into the fluid compartment 170 where it will be stored for future use.

In operation, the fluid hammer disposed below the accumulator 400 does not consume any fluid when the fluid hammer piston is at the impact position or at the top of its stroke, and a pressure spike results due to the water hammer effect. When this pressure spike reaches the accumulator 400, an influx of fluid 180 flows through the flow channel 495 into the fluid compartment 170, expanding the bladder 115 and thereby compressing the nitrogen 175 in the gas compartment 165. By compressing the nitrogen 175, the pressure of the nitrogen 175 increases and more energy is stored in the gas compartment 165. Then, on the down stroke cycle, when the fluid hammer piston is capable of consuming more than the nominal flow rate, the differential pressure drops dramatically. As the system pressure drops below the compressed pressure of the nitrogen 175 in the gas compartment 165, the bladder 115 will collapse toward the mandrel 160, thereby forcing fluid 180 out of the fluid compartment 170, into the flow channel 495, into the chamber 402 and towards the downstream device. Thus, as fluid 180 is forced out of the fluid compartment 170, the accumulator 400 instantaneously provides the fluid hammer with a higher flow rate than the nominal flow rate that is continuously being pumped into the hydraulic system. As in the accumulator 100 of FIGS. 1-3, once the piston 407 of the accumulator 400 of FIG. 6 engages shoulder 197, the piston 407 will no longer move in response to pressure fluctuations in the system. Instead, only the bladder 115 will expand or contract.

Any of the foregoing representative embodiments of inline bladder-type accumulators may be employed in conjunction with downhole equipment that creates fluid pressure pulsations, including fluid hammers, reciprocating pumps, pressure intensifiers, and the like, to mitigate the effects of those pressure pulsations, and to store the hydraulic energy associated with those pressure pulsations. For example, during downhole drilling with a fluid hammer, the hammer piston cycles continuously between a position at the top of its stroke and an impact position where it strikes against the hammer bit. At these two locations, the piston is not moving, and therefore not consuming any fluid, which causes pressure fluctuations that can be destructive to drill string equipment and represent a loss of energy if not captured and stored. Any of the foregoing embodiments of the inline bladder-type accumulator may be employed in conjunction with the fluid hammer to mitigate the effects of pressure pulsations produced by the hammer, and to store the hydraulic energy associated with those pulsations for subsequent use, thus improving the energy efficiency and overall fluid hammer performance.

Figure 7:
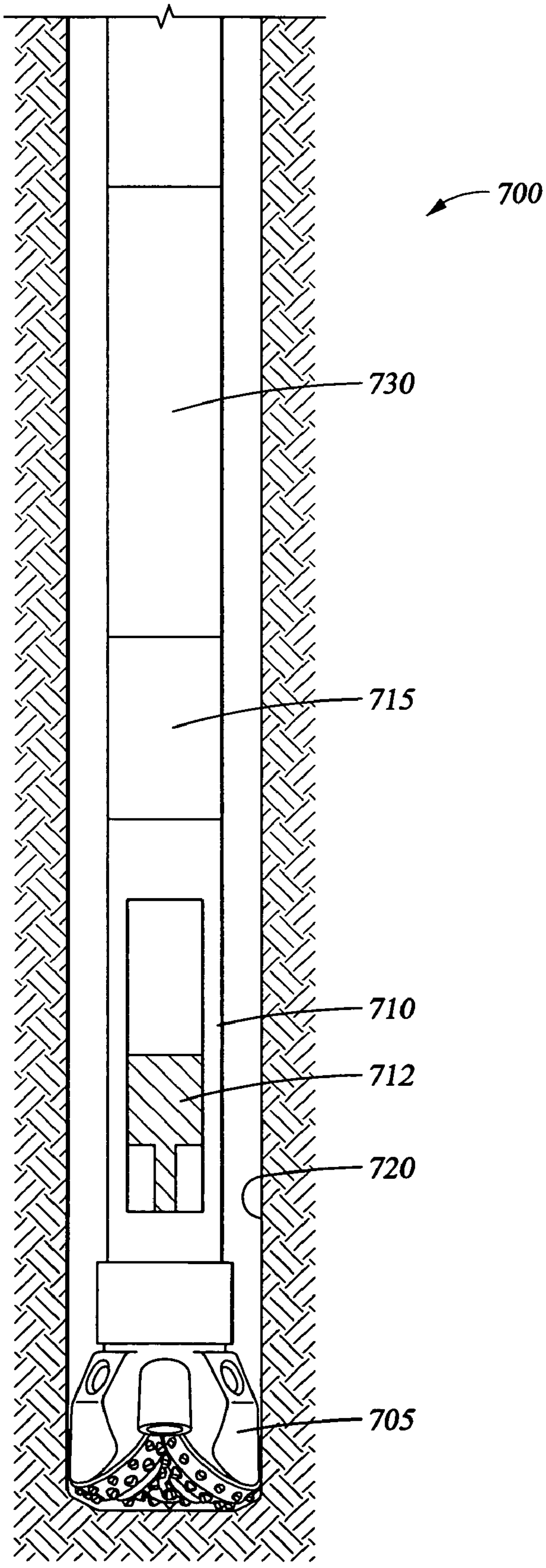
FIG. 7 is a schematic view of a representative drilling assembly comprising an inline accumulator, a fluid hammer, and a fluid hammer bit.

FIG. 7 depicts one representative drilling assembly 700 disposed within a well bore 720 comprising an inline bladder-type accumulator 730 connected by a top sub 715 to a fluid hammer 710 comprising a piston 712, which in turn connects to an associated hammer bit 705. In an embodiment, the accumulator 730 is installed within about 10 feet or less of the fluid hammer 710 to provide an adequately fast response to the pressure fluctuations. In another embodiment, the accumulator 730 may be integral to the fluid hammer 710. The inline bladder-type accumulator 730 is used in conjunction with the fluid hammer 710 to mitigate the effects of the pressure pulsations produced by the fluid hammer 710 as the hammer piston 712 cycles, and to store the hydraulic energy associated with those pressure pulsations for subsequent use by the hammer 710 to enhance the horsepower delivered to the hammer bit 705.

In operation, the fluid hammer 710 creates a variable restriction to flow as a result of changes in the velocity of the hammer piston 712 during the stroke. Thus, pressure fluctuations caused by the motion of the piston 712 within the fluid hammer 710 can be absorbed by the inline bladder-type accumulator 730 during operation of the fluid hammer 710. When system pressure differential falls below the intended operating pressure of the fluid hammer 710, and therefore, loss of horsepower for drilling occurs, fluid stored in the accumulator 730 will be injected instantaneously into the fluid hammer 710 to enhance the horsepower available for drilling, thus improving the performance of the drilling assembly 700.

Figure 8:
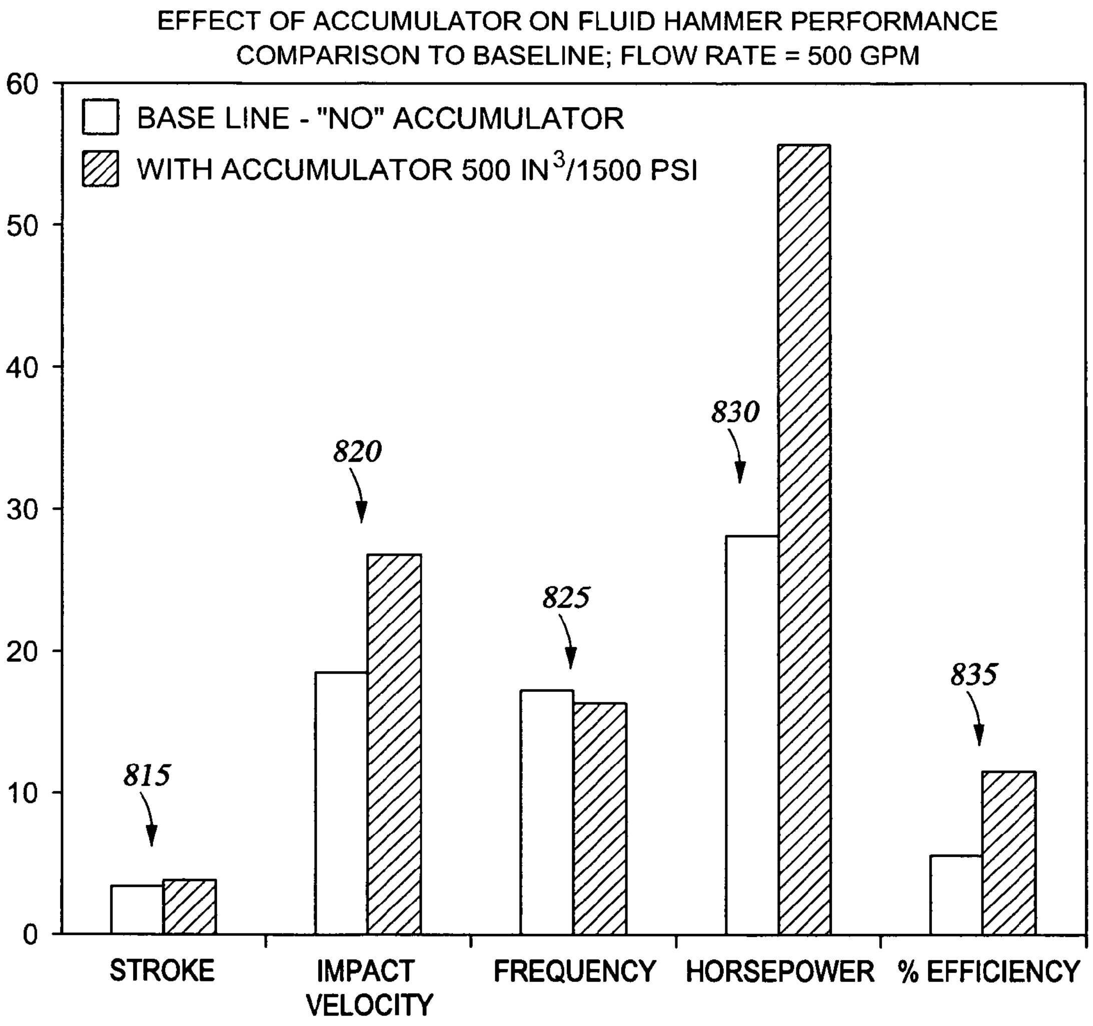
FIG. 8 is a bar plot showing the effect of a quick-acting accumulator on fluid hammer performance as compared to fluid hammer performance in the absence of an accumulator.

FIG. 8 is a bar plot illustrating the effect of an inline bladder-type accumulator 730 on fluid hammer 710 performance, as compared to fluid hammer 710 performance in the absence of any accumulator 730 in the drilling assembly 700. The analytical results presented in this plot are based on a fluid flow rate of 500 gallons per minute (gpm) through the drilling assembly 700. The horizontal axis 810 indicates a number of fluid hammer 710 performance indicators, and specifically from left to right, stroke 815, impact velocity 820, frequency 825, horsepower 830, and efficiency 835. Important to the performance of the accumulator 730 is the accumulator downhole volume 905. The following equations calculate the accumulator downhole volume 905, which is the actual volume of gas 175 within gas compartment 165 when the accumulator 730 is downhole:

$$V_D=(P_A\times V_O/T_O)\times(T_D/P_D) \qquad (1)$$

Where:

$V_D$=accumulator downhole volume 905
$P_A$=precharge pressure
$V_O$=accumulator surface volume 945
$T_O$=temperature at the surface
$T_D$=temperature downhole
$P_D$=pressure downhole The temperature downhole ($T_D$) is given by the following equation:

$$T_D=T_O+0.01\times D \qquad (2)$$

Where:

D=average depth of the formation interval

The pressure downhole ($P_D$) is given by the following equation:

$$P_D=0.052\times W\times D \qquad (3)$$

Where:

W=weight of the fluid 180 in pounds (lb.) per gallon

In an embodiment, the accumulator 730 will have a precharge pressure ($P_A$) that is approximately 30 percent to 70 percent of the anticipated downhole pressure ($P_D$).

Referring again to FIG. 8, as the bars indicate, operating an inline bladder-type accumulator 730 with an accumulator downhole volume 905 of 500 cubic inches (in3) at 1,500 pounds per square inch (psi) precharge pressure in conjunction with the fluid hammer 710 approximately doubles the horsepower 830 available to the fluid hammer 710 and improves the impact velocity 820 as well as the efficiency 835 of the fluid hammer 710.

Figure 9:
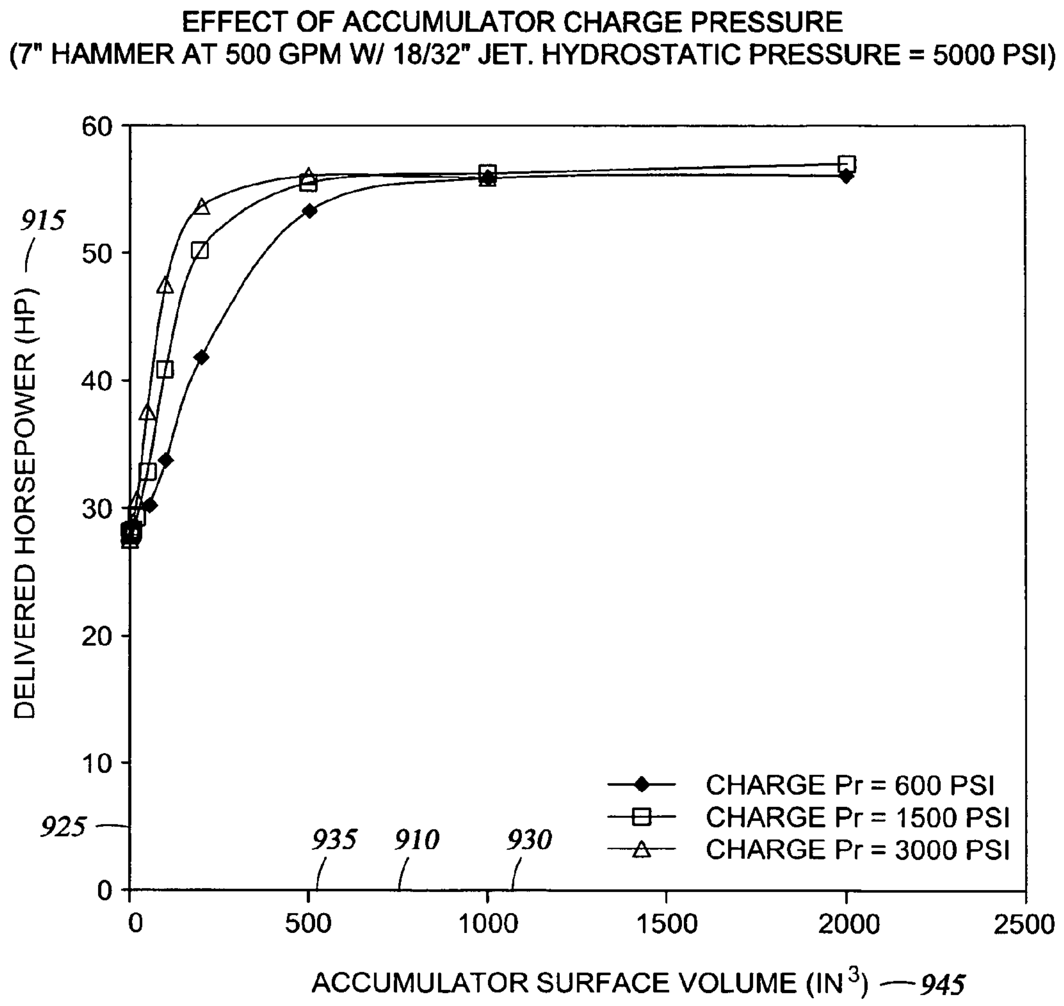
FIG. 9 is a line plot showing the effect of accumulator surface volume on fluid hammer performance as a function of precharge pressure.

The horsepower performance enhancing capability of the inline bladder-type accumulator 730 may be maximized by optimizing the accumulator surface volume 945 for a particular size fluid hammer 710 in relation to the precharge pressure. FIG. 9 is a line plot illustrating the effect, for various precharge pressures, of the accumulator surface volume 945 on horsepower delivered to a 7-inch fluid hammer 710 operating at 500 gallons per minute (gpm) at a hydrostatic pressure of 5,000 psi. In this plot, the accumulator surface volume 945 (e.g. the volume of the gas 175 in the gas compartment 165 as shown in FIG. 2) is shown on the horizontal axis 910 and horsepower delivered 915 from the fluid hammer 710 to the hammer bit 705 is shown on the vertical axis 925. There are three curves shown, each based on a different precharge pressure, namely 600 psi, 1,500 psi, and 3,000 psi. The analytical results presented in this plot illustrate that, for a given accumulator surface volume 945, in general, the delivered horsepower 915 to the fluid hammer 710 increases as precharge pressure increases. There is, however, an upper limit 930 on accumulator surface volume 945 beyond which increasing the accumulator surface volume 945 does not correspondingly increase horsepower delivered 915 by the fluid hammer 710. For the 7-inch fluid hammer 710 operating at 500 gpm, that upper limit 930 occurs at an accumulator surface volume 945 of about 1000 cubic inches for all three illustrated precharge pressures. Beyond this upper limit 930, increasing the accumulator surface volume 945 does not provide any noticeable improvement to horsepower delivered 915, or fluid hammer 710 performance.

There is also a lower limit 935 on the accumulator surface volume 945 to maximize horsepower delivered 915, and that lower limit 935 falls between approximately 500 cubic inches and 800 cubic inches for all three illustrated precharge pressures. Per FIG. 9, significant increases in horsepower delivered 915 by the 7-inch fluid hammer 710 occur for all precharge pressures as the accumulator surface volume 945 increases to about 500 cubic inches. This demonstrates that the full performance enhancing benefit to be gained from using an inline bladder-type accumulator 730 is not realized for accumulator surface volumes 945 below about 500 cubic inches for the given fluid hammer 710 size, flow rate, hydrostatic pressure, and precharge pressures. In short, FIG. 9 demonstrates that the optimum range for accumulator surface volume 945 is between 500 cubic inches and 1000 cubic inches for the three precharge pressures shown.

Both the precharge pressure and the accumulator downhole volume 905 (i.e. the volume of gas 175 in the gas chamber 165 when the accumulator 730 is downhole as shown in FIG. 3), which is a function of accumulator surface volume 945, ultimately control the percentage improvement in performance. The accumulator downhole volume 905 is a function of the precharge pressure $P_A$, the pressure downhole $P_D$, and the temperature downhole $T_D$ as given by equation (1) above.

The horsepower delivered 915 by the fluid hammer 710 to the hammer bit 705 is also a function of the ratio of the accumulator downhole volume 905 to the downstroke volume of the fluid hammer. As used herein, the downstroke volume is defined as the maximum volume of the upper chamber of the fluid hammer, which occurs at a position when the fluid hammer piston 712 impacts the hammer bit 705. The objective is to supply this upper chamber with sufficient fluid as the downstroke volume increases when the fluid hammer piston 712 rapidly accelerates prior to impacting the hammer bit 705.

Figure 10:
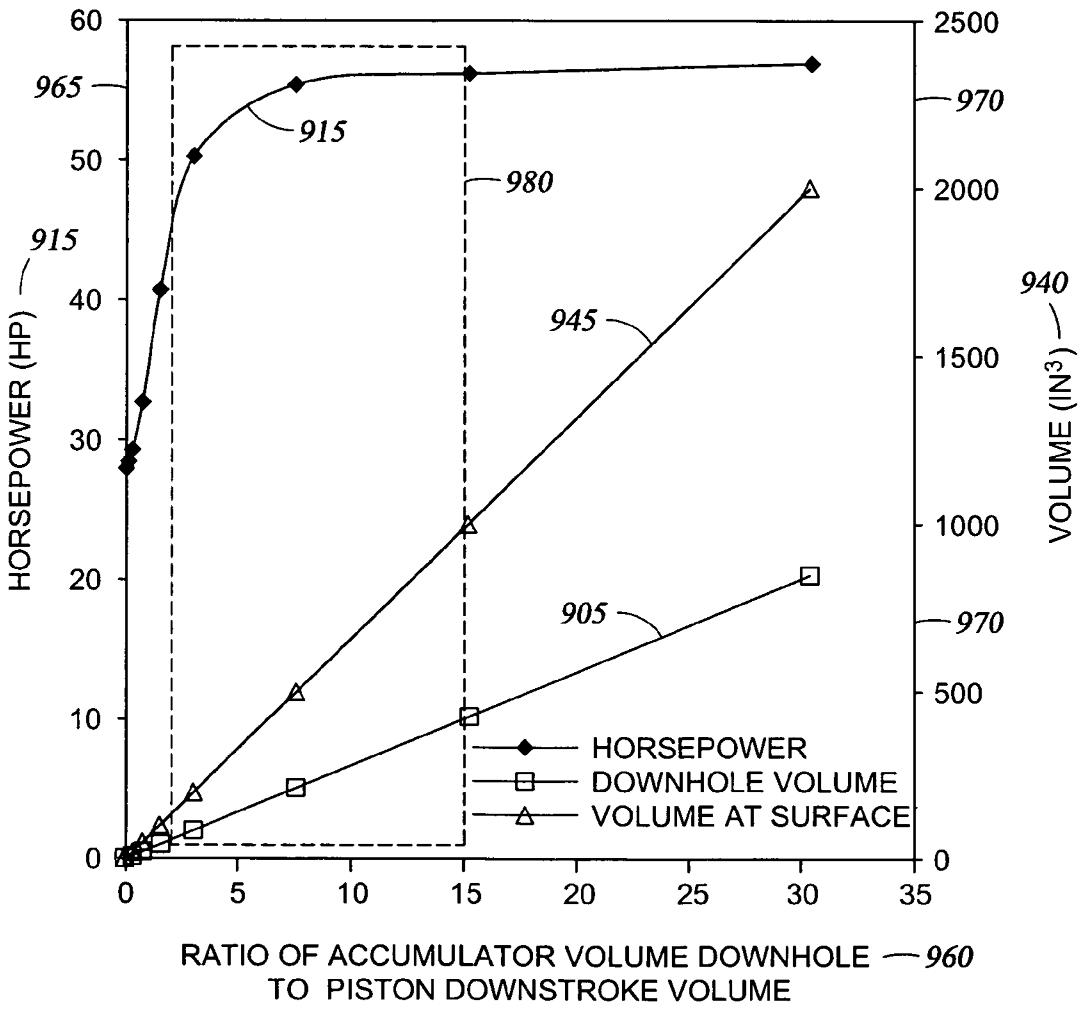
FIG. 10 is a line plot showing fluid hammer performance as a function of the ratio of accumulator downhole volume to displaced hammer piston downstroke volume.

Optimizing the ratio 960 of accumulator downhole volume 905 to fluid hammer piston 712 downstroke volume can maximize the horsepower delivered 915 by the fluid hammer 710, or in other words, the fluid hammer 710 performance. FIG. 10 is a line plot illustrating this relationship at a hydrostatic pressure of 5,000 psi. In this plot, the horizontal axis 955 shows the ratio 960 of accumulator downhole volume 905 to fluid hammer piston 712 downstroke volume. The left vertical axis 965 shows horsepower delivered 915 and the right vertical axis 970 shows volume 940, with plots of delivered horsepower 915 as well as accumulator downhole volume 905 and accumulator surface volume 945 shown. These results indicate that the optimum range 980 for increasing horsepower delivered 915 by the fluid hammer 710 occurs when the ratio 960 of accumulator downhole volume 905 to fluid hammer piston 712 downstroke volume falls in a range of about 2 to 15. Below that range, the fluid hammer 710 is not realizing the full benefit of the inline bladder-type accumulator 730, and above that range, the fluid hammer 710 does not noticeably improve, although the costs associated with increasing the accumulator surface volume 945 would. In summary, for a hydrostatic pressure of 5,000 psi and a precharge pressure in the range of 600 psi to 3,000 psi, operating an inline bladder-type accumulator 730 with a ratio 960 of accumulator downhole volume 905 to fluid hammer piston 712 downstroke volume in the range from about 2 to 15 mitigates the pressure pulsations produced by the fluid hammer 710 while producing a delivered horsepower of at least 25 percent greater, and up to double, the fluid hammer 710 baseline horsepower performance. It is anticipated that fluid hammers 710 may be used in wells with hydrostatic pressures of 8,000 psi or more. At a hydrostatic pressure in this range, the optimum ratio 960 of accumulator downhole volume 905 to fluid hammer piston 712 downstroke volume would be on the order of 25.

Although the bar plot of FIG. 8, and the line plots of FIGS. 9 and 10, were prepared based on a bladder-type accumulator 730, only the accumulator downhole volume 905 is involved in the modeling, so any type of accumulator construction may apply. However, the modeling presumes an instantaneous response from the accumulator 730 to pressure fluctuations, so the accumulator design must be very responsive for these results to apply. Therefore, the accumulator cannot have a mass-intensive design, or the models would have to be adjusted for time dependencies.

The foregoing descriptions of specific embodiments of inline bladder-type accumulators 100, 200, 300, 400 with anti-extrusion capability, and the application of an inline accumulator 730 to a fluid hammer 710 have been presented for purposes of illustration and description and are not intended to be exhaustive or to limit the invention to the precise forms disclosed. Obviously many other modifications and variations of these embodiments are possible. In particular, the form of the anti-extrusion device itself may be varied, whether that device takes the shape of a piston, a ported mandrel, or another configuration. The inline accumulator configuration may also be varied to be a flow-through or a flow-around type accumulator.

While specific embodiments of inline bladder-type accumulators with anti-extrusion capability and the methods of designing and using such accumulators have been shown and described herein, modifications may be made by one skilled in the art without departing from the spirit and the teachings of the invention. The embodiments and methods described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

What we claim as our invention is:

1. An accumulator for downhole operations comprising:

a housing that connects inline to a hydraulic system;

an elastomeric bladder disposed internally of the housing and separating a gas compartment from a fluid compartment; and an anti-extrusion device having a first position that prevents extrusion of the elastomeric bladder into the hydraulic system and blocks the fluid compartment from fluid communication with the hydraulic system, and a second position that opens the fluid compartment to fluid communication with the hydraulic system;

wherein the anti-extrusion device does not move from the second position in response to pressure fluctuations in the hydraulic system during operation.

2. The accumulator of claim 1 wherein the anti-extrusion device moves from the first position to the second position in response to a downhole pressure.

3. The accumulator of claim 1 wherein the anti-extrusion device moves from the first position to the second position in response to a combination of downhole pressure and operating differential pressure.

4. The accumulator of claim 1 further comprising:

a mandrel disposed internally of the housing;

wherein the fluid compartment is formed between the bladder and the mandrel.

5. The accumulator of claim 4 wherein the anti-extrusion device comprises a piston that engages the mandrel in the first position to form an extrusion gap sized to prevent the bladder from extruding into the hydraulic system when a precharge pressure is applied to the gas compartment.

6. The accumulator of claim 4 wherein the mandrel comprises an internal flow bore in fluid communication with the hydraulic system.

7. The accumulator of claim 4 wherein the mandrel comprises at least one port in fluid communication with the fluid compartment when the anti-extrusion device is in the second position.

8. The accumulator of claim 7 wherein the mandrel is the anti-extrusion device.

9. The accumulator of claim 7 further comprising springs that bias the anti-extrusion device to the first position.

10. The accumulator of claim 1 further comprising a flow diverter that diverts a well bore fluid towards the fluid compartment.

11. The accumulator of claim 1 wherein the anti-extrusion device is a cylinder; and wherein the fluid compartment is formed between the bladder and the cylinder.

12. The accumulator of claim 11 further comprising springs that bias the anti-extrusion device to the first position.

13. The accumulator of claim 1 wherein the elastomeric bladder comprises a highly saturated nitrile material.

14. The accumulator of claim 1 wherein only the elastomeric bladder responds dynamically to the pressure fluctuations in the hydraulic system during operation.

* * * * *